(12) United States Patent
Vargantwar

(10) Patent No.: US 8,306,564 B1
(45) Date of Patent: Nov. 6, 2012

(54) METHOD AND SYSTEM OF SENDING POWER CONTROL COMMANDS

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 255 days.

(21) Appl. No.: 12/862,744

(22) Filed: Aug. 24, 2010

(51) Int. Cl.
*H04B 7/00* (2006.01)

(52) U.S. Cl. ............................. 455/522; 455/68; 455/69

(58) Field of Classification Search ............... 455/67.11, 455/68–70, 115.3, 126, 127.1, 127.2, 135, 455/226.3, 277.2, 296; 370/318
See application file for complete search history.

(56) References Cited

U.S. PATENT DOCUMENTS

| | | | |
|---|---|---|---|
| 6,208,873 B1 | 3/2001 | Black et al. | |
| 6,256,301 B1 | 7/2001 | Tiedemann, Jr. et al. | |
| 7,813,754 B2 * | 10/2010 | Usuda et al. | 455/522 |
| 7,965,141 B2 * | 6/2011 | Dooper et al. | 330/207 A |
| 2004/0092233 A1 | 5/2004 | Rudrapatna | |
| 2004/0106423 A1 * | 6/2004 | McGowan et al. | 455/522 |
| 2004/0259560 A1 * | 12/2004 | Hosein et al. | 455/452.1 |
| 2005/0143113 A1 | 6/2005 | Lee et al. | |
| 2005/0153671 A1 | 7/2005 | Ichikawa | |
| 2007/0026865 A1 * | 2/2007 | Yano et al. | 455/438 |
| 2007/0191044 A1 | 8/2007 | Kostic et al. | |
| 2007/0243894 A1 * | 10/2007 | Das et al. | 455/522 |
| 2007/0298825 A1 * | 12/2007 | Kayama et al. | 455/522 |
| 2008/0057963 A1 * | 3/2008 | Kayama et al. | 455/442 |

* cited by examiner

*Primary Examiner* — Dominic E Rego

(57) ABSTRACT

An exemplary power control command (PCC) transmission scheme is disclosed. In a first aspect, an access terminal may decrease the rate at which to send PCCs directed to an access network in time periods during which a reverse noise on the wireless link over which the access terminal and access network are communicating is greater than a threshold value. In a second aspect, the access terminal may suspend transmission of a first type of PCCs (e.g., either "power up" or "power down" PCCs) directed to the access network in time periods during which the access network's forward transmission power to the access terminal is at boundary level. The exemplary PCC transmission scheme may thus enable the access terminal to decrease the amount of PCC data sent to the access network, which may in turn decrease the reverse noise on the wireless link and thereby improve reverse-link communication.

20 Claims, 6 Drawing Sheets

METHOD AND SYSTEM OF SENDING POWER CONTROL COMMANDS

BACKGROUND

To provide cellular wireless communication service, a wireless service provider typically operates an access network that functions to connect one or more access terminals (e.g., cell phones, PDAs, laptops, netbooks, tablets, and/or other wirelessly-equipped devices) with one or more transport networks. In a typical access network, an area is divided geographically into a number of coverage areas, such as cells and sectors, each defined by a radio frequency (RF) radiation pattern from a respective base transceiver station (BTS). Within each coverage area, the BTS's RF radiation pattern may provide one or more wireless links, each on a carrier (or set of carriers), over which access terminals may communicate with the access network. In turn, the access network may provide connectivity with the public switched telephone network (PSTN), the Internet, and/or other transport networks.

The wireless links may carry communications between the access network and the access terminals according to any of a variety of wireless protocols. Depending on the protocol employed, each wireless link may also be divided into a plurality of channels for carrying communications between the access network and the access terminals. For example, each wireless link may include a plurality of forward-link channels, such as forward traffic channels, for carrying communications from the access network to the access terminals. As another example, each wireless link may include a plurality of reverse-link channels, such as reverse traffic channels, for carrying communications from the access terminals to the access network.

In many wireless protocols, the access network and active access terminals may engage in a power-control process to control transmission power for communications over established traffic channels. For purposes of illustration, the embodiments herein will be described by way of example with reference to a power-control process carried out by an active access terminal to control the forward transmission power of the access network. It should be understood, however, that a similar power-control process may be carried out by the access network to control the reverse transmission power of the active access terminals.

In an example power-control process, an active access terminal may regularly send power control commands (PCCs) directed to the access network, to control the access network's transmission power on a forward traffic channel to the active access terminal (i.e., the forward transmission power to the active access terminal). For example, the active access terminal may regularly compare a signal-quality metric of forward traffic-channel communications received from the access network to a signal-quality threshold value and thereby decide whether to send a "power up" PCC that instructs the access network to increase its forward transmission power to the active access terminal or a "power down" PCC that instructs the access network to decrease its forward transmission power to the active access terminal. For instance, if the signal-quality metric is less than the signal-quality threshold value (thus indicating a weaker signal), the active access terminal may send a "power up" PCC directed to the access network. Alternatively, if the signal-quality metric is greater than the signal-quality threshold value (thus indicating a stronger signal), the active access terminal may send a "power down" PCC directed to the access network.

As a result of the active access terminal regularly sending PCCs directed to the access network, the access network may regularly receive PCCs from the active access terminal. (It should be understood, however, that the access network may fail to receive some PCCs sent by the active access terminal due to poor reverse-link conditions or other factors.) In response to each PCC received from the active access terminal, the access network may then responsively adjust its forward transmission power to the active access terminal in accordance with the PCC. For instance, in response to receiving a "power up" PCC from the active access terminal, the access network may increase its forward transmission power to the active access terminal. And in response to receiving a "power down" PCC from the active access terminal, the access network may decrease its forward transmission power to the active access terminal.

Advantageously, this power-control process may enable the active access terminal and the access network to balance between keeping traffic-channel communications strong enough to overcome interference and preventing traffic-channel communications from becoming so strong that they unduly interfere with other communications.

Overview

In some protocols such as EIA/TIA/IS-2000 Rel. 0, Rel. A, or other versions thereof (hereafter "IS-2000"), each active access terminal in a given coverage area may regularly send power control commands (PCCs) directed to an access network on a respective reverse channel of a wireless link at a predefined transmission rate (e.g., 800 PCCs/second). Along with other data transmitted on reverse channels of the wireless link (e.g., traffic data), this PCC data contributes to the aggregate noise on the reverse link of the wireless link (i.e., the reverse noise). At certain times, such as when there are many active access terminals communicating on the wireless link, this reverse noise may increase to an unacceptable level that hinders the access network's ability to receive reverse-link communications from the active access terminals in the given coverage area. Accordingly, it would be desirable to have a PCC transmission scheme in which active access terminals can decrease the amount of PCC data sent to an access network, which may in turn decrease the reverse noise and thereby improve reverse-link communications.

Disclosed herein is such a PCC transmission scheme. According to an exemplary PCC transmission scheme, an active access terminal can decrease the amount of PCC data sent to the access network in certain circumstances, which may in turn decrease the reverse noise on the wireless link and thereby improve reverse-link communication. In a first aspect of the exemplary PCC transmission scheme, the active access terminal may decrease the PCC transmission rate for the access network (i.e., how often to generate and send PCCs directed to the access network) in time periods during which the reverse noise on the wireless link is greater than a threshold value. In a second aspect of the exemplary PCC transmission scheme, the active access terminal may suspend transmission of a first type of PCCs (e.g., either "power up" or "power down" PCCs) directed to the access network in time periods during which the access network's forward transmission power to the active access terminal is at a boundary level. An active access terminal may implement these aspects of the exemplary PCC transmission scheme either together or separately.

The first aspect of the exemplary PCC transmission scheme may take the form of an exemplary method that includes an access terminal (a) sending a first series of PCCs directed to the access network at a full transmission rate, (b) receiving from the access network a first indicator of reverse noise on the wireless link, where the first indicator indicates that the reverse noise is greater than a threshold value, (c) in response to receiving the first indicator of the reverse noise, deciding to decrease the transmission rate at which to send PCCs directed to the access network from the full transmission rate to a reduced transmission rate; and (d) in response to deciding to decrease the transmission rate at which to send PCCs directed to the access network, sending a second series of PCCs directed to the access network at the reduced transmission rate.

The first indicator of the reverse noise may take various forms. In one example, the first indicator of the reverse noise may include an indicator specifying that the reverse noise is greater than the threshold value. As another example, the first indicator of the reverse noise may include a reverse noise rise (RNR) value that is greater than the threshold value. Other examples are possible as well.

Further, the first and second series of PCCs may take various forms. In one example, the first and second series of PCCs may include both a first type of PCCs and a second type of PCCs (e.g., both "power up" and "power down" PCCs). In another example, the first and second series of PCCs may include only a second type of PCCs (e.g., only one of "power up" and "power down" PCCs). Other examples are possible as well.

Further yet, the feature of deciding to decrease the transmission rate at which to send PCCs directed to the access network in response to receiving the first indicator of the reverse noise may take various forms. In one example, this feature may include (1) in response to receiving the first indicator of the reverse noise, consulting a table correlating indicators of reverse noise with transmission rates to identify a transmission rate that correlates to the first indicator of the reverse noise, (2) determining that the identified transmission rate is the reduced transmission rate, and (3) in response to determining that the identified transmission rate is the reduced transmission rate, deciding to decrease the transmission rate at which to send PCCs directed to the access network from the full transmission rate to the reduced transmission rate.

In another example, this feature may include (1) in response to receiving the first indicator of the reverse noise, comparing the first indicator of the reverse noise to the threshold value and thereby determining that the first indicator of the reverse noise is greater than the threshold value, and (2) in response to determining that the first indicator of the reverse noise is greater than the threshold value, deciding to decrease the transmission rate at which to send PCCs directed to the access network from the full transmission rate to the reduced transmission rate.

In yet another example, this feature may include (1) in response to receiving the first indicator of the reverse noise, comparing the first indicator of the reverse noise to a previously-received indicator of the reverse noise and thereby determining that the first indicator of the reverse noise is greater than the previously-received indicator of the reverse noise, and (2) in response to determining that the first indicator of the reverse noise is greater than the previously-received indicator of the reverse noise, deciding to decrease the transmission rate at which to send PCCs directed to the access network from the full transmission rate to the reduced transmission rate. Other examples are possible as well.

The exemplary method may also include additional features. For example, the exemplary method may additionally include the access terminal (e) receiving from the access network a second indicator of the reverse noise on the wireless link, wherein the second indicator indicates that the reverse noise is less than a threshold value, (f) in response to receiving the second indicator of the reverse noise, deciding to increase the transmission rate at which to send PCCs directed to the access network from the reduced transmission rate back to the full transmission rate; and (g) in response to deciding to increase the transmission rate at which to send PCCs directed to the access network, sending a third series of PCCs directed to the access network at the full transmission rate. Other examples are possible as well.

The second aspect of the exemplary PCC transmission scheme may take the form of an exemplary method that includes an access terminal (a) sending a first series of PCCs directed to the access network, wherein the first series of PCCs includes both a first type of PCCs and a second type of PCCs, (b) receiving from the access network a first indicator of a power level at which the access network is transmitting to the access terminal on the wireless link, wherein the first indicator indicates that the power level is at a boundary level, (c) in response to receiving the first indicator of the power level, deciding to suspend transmission of the first type of PCCs directed to the access network, and (d) in response to deciding to suspend transmission of the first type of PCCs directed to the access network, sending a second series of PCCs directed to the access network, wherein the second series of PCCs includes only the second type of PCCs.

The boundary level and the first and second types of PCCs may take various forms. In one example, the boundary level may be a maximum level, the first type of PCCs may be "power up" PCCs that instruct the access network to increase the power level at which the access network is transmitting to the access terminal on the wireless link, and the second type of PCCs may be "power down" PCCs that instruct the access network to decrease the power level at which the access network is transmitting to the access terminal on the wireless link. In another example, the boundary level may be a minimum level, the first type of PCCs may be "power down" PCCs that instruct the access network to decrease the power level at which the access network is transmitting to the access terminal on the wireless link, and the second type of PCCs may be "power up" PCCs that instruct the access network to increase the power level at which the access network is transmitting to the access terminal on the wireless link. Other examples are possible as well.

Further, the first indicator of the power level may take various forms. In one example, the first indicator of the power level may include an indicator specifying that the power level is at a given boundary level. In another example, the first indicator of the power level may include an $E_c$ power level at which the access network is transmitting to the access terminal on the wireless link.

Further yet, access terminal may be sending the first and second series of PCCs at various transmission rates. For example, access terminal may be sending the first and second series of PCCs at a full transmission rate. As another example, access terminal may be sending the first and second series of PCCs at a reduced transmission rate. Other examples are possible as well.

Still further, the feature of sending the second series of PCCs directed to the access network may take various forms. In one example, this feature may include foregoing transmission of a PCC at any time in the second series during which the access terminal would otherwise be sending a PCC of the first type of PCCs. Other examples are possible as well.

The exemplary method may also include additional features. For example, the exemplary method may additionally include the access terminal (e) receiving from the access network a second indicator of the power level at which the access network is transmitting to the access terminal on the wireless link, wherein the second indicator indicates that the power level is not at a boundary level, (f) in response to receiving the second indicator of the power level, the access terminal deciding to resume transmission of the first type of PCCs directed to the access network, and (g) in response to deciding to resume transmission of the first type of PCCs directed to the access network, the access terminal sending a third series of PCCs directed to the access network, wherein the third series of PCCs includes both the first type of PCCs and the second type of PCCs. Other example are possible as well.

Also disclosed herein is an exemplary access terminal capable of implementing the exemplary PCC transmission scheme. The exemplary access terminal may include (a) a wireless communication interface configured to facilitate wireless communication with an access network on a wireless link, (b) a processor, (c) data storage, and (d) program instructions stored in data storage and executable by the processor to carry out the features described herein.

These as well as other aspects and advantages will become apparent to those of ordinary skill in the art by reading the following detailed description, with reference where appropriate to the accompanying drawings.

DETAILED DESCRIPTION

I. Communications System

Figure 1:
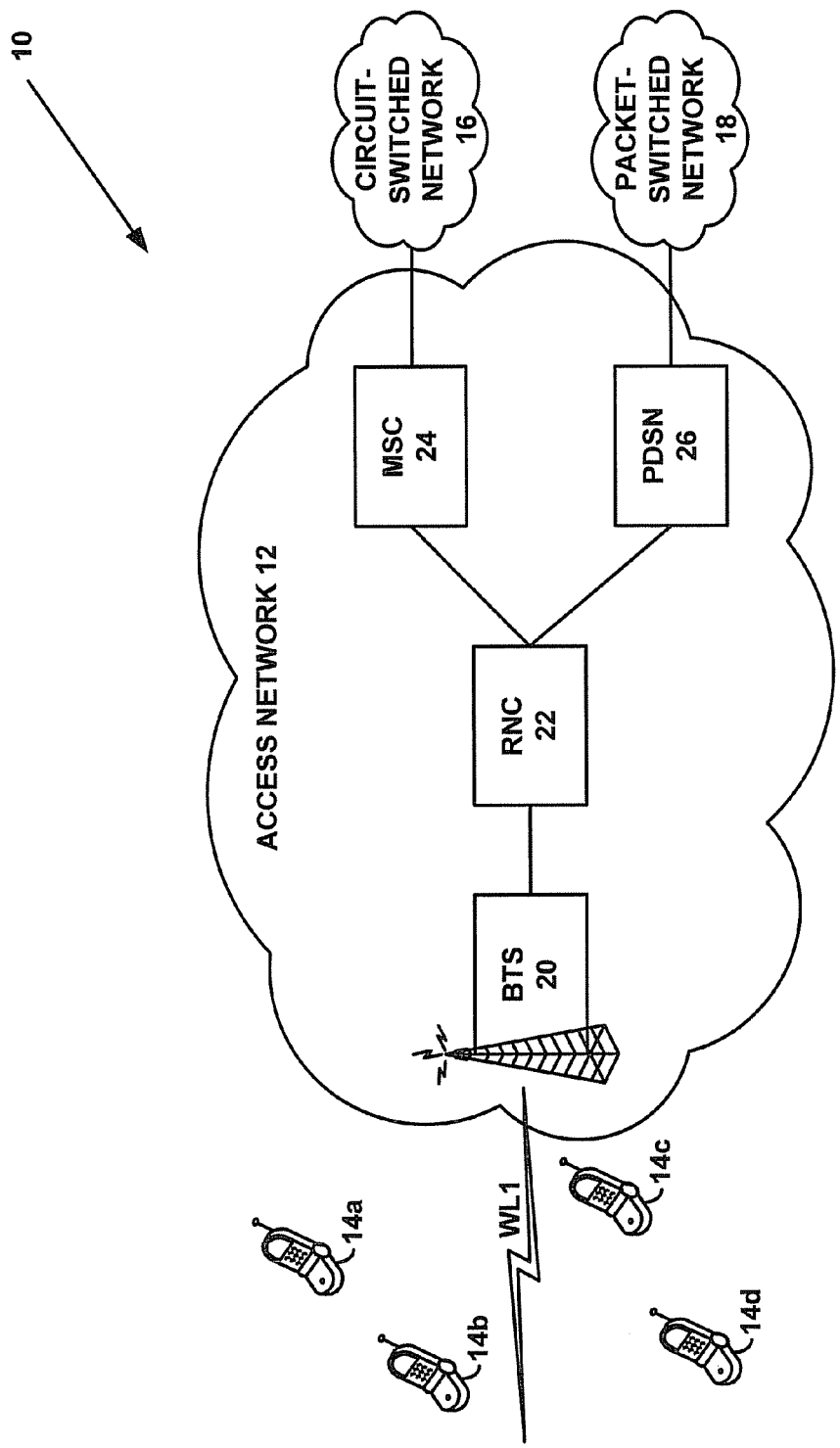
FIG. 1 is a simplified block diagram of a communication system in which an exemplary power control command (PCC) transmission scheme can be implemented.

FIG. 1 is a simplified block diagram of a communications system 10 in which an exemplary PCC transmission scheme can be implemented. As shown, the system 10 may include an access network 12 that functions to provide connectivity between one or more access terminals (e.g., cell phones, PDAs, laptops, netbooks, tablets, and/or other wirelessly-equipped devices), such as active access terminals 14a-d, and one or more transport networks, such as a circuit-switched network 16 (e.g., the Public Switched Telephone Network (PSTN)) and a packet-switched network 18 (e.g., the Internet).

It should be understood that the arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions written in any suitable programming language (e.g., C, C++, Java, etc.) and stored in memory.

As shown in FIG. 1, access network 12 may include a base transceiver station (BTS), such as BTS 20. (Although FIG. 1 depicts access network 12 as including one BTS, it should be understood that access network 12 may include a plurality of BTSs.) BTS 20 may be any entity that facilitates wireless communication between access network 12 and access terminals 14a-d. In this respect, BTS 20 may radiate to define one or more wireless coverage areas, such as a cell and/or cell sectors. Within each coverage area, BTS 20 may provide at least one wireless link on a respective carrier frequency, such as wireless link $WL_1$, over which access terminals 14a-d may communicate with BTS 20. (As used herein, the term "carrier frequency" may include a single carrier frequency or a set of carrier frequencies). BTS 20 may also function to control aspects of wireless communication with access terminals 14a-d, such as aspects of a power-control process.

Wireless link $WL_1$ may carry communications between access network 12 and access terminals 14a-d according to any of a variety of protocols, such as CDMA (e.g., IS-2000 or IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, or other protocols now known or later developed. Further, wireless link $WL_1$ may be divided into a forward link for carrying communications from access network 12 to access terminals 14a-d and a reverse link for carrying communications from access terminals 14a-d to access network 12. In turn, the forward link and the reverse link may be divided into a plurality of channels.

For purposes of illustration, the embodiments herein will be described by way of example with reference to IS-2000. According to IS-2000, wireless link $WL_1$ may be identified by its carrier frequency and a unique pseudonoise offset ("PN offset") that distinguishes wireless link $WL_1$ from wireless links in adjacent coverage areas. Further, according to IS-2000, the forward link may be code division multiplexed via Walsh codes into various forward channels for carrying communications from access network 12 to access terminals 14a-d, such as a forward pilot channel, a forward sync channel, forward paging channels, a forward broadcast control channel, forward common control channels, and forward traffic channels. Similarly, according to IS-2000, the reverse link may be code division multiplexed via Walsh codes into various reverse channels for carrying communications from access terminals 14a-d to access network 12, such as a reverse access channel, reverse pilot channels, and reverse traffic channels.

As further shown in FIG. 1, BTS 20 of access network 12 may couple to a radio network controller (RNC), such as RNC 22. (Although FIG. 1 depicts access network 12 as including one RNC, it should be understood that access network 12 may include more than one RNC, in which case each RNC may couple to a subset of the BTSs in access network 12. Further, although BTS 20 and RNC 22 are depicted as separate entities, it should be understood that these entities may be integrated together, in which case BTS 20 and RNC 22 may together be referred to as an "access node.") RNC 22 may function to communicate with BTS 20 and control aspects of wireless communication with access terminals 14a-d. RNC 22 may also provide connectivity with one or more transport networks via one or more switches or gateways. For example, as shown, the RNC 22 may couple to mobile switching center (MSC) 24 that provides connectivity with circuit-switched network 16 and packet data serving node (PDSN) 26 that provides connectivity with packet-switched network 18. Other examples are possible as well.

II. Current PCC Transmission Scheme

In the example communication system 10 described in FIG. 1, each of access terminals 14a-d may regularly send PCCs directed to BTS 20, to control the BTS's transmission power on the respective forward traffic channels with access terminals 14a-d (i.e., the forward transmission power to each of access terminals 14a-d). For example, access terminal 14a may regularly compare a signal-quality metric (e.g., $E_b/N_o$) of forward traffic channel communications received from BTS 20 to a signal-quality threshold value and thereby decide whether to send a "power up" PCC that instructs BTS 20 to increase its forward transmission power to access terminal 14a or a "power down" PCC that instructs BTS 20 to decrease its forward transmission power to access terminal 14a. For instance, if the signal-quality metric is less than the signal-quality threshold value (thus indicating a weaker signal), access terminal 14a may send a "power up" PCC directed to BTS 20. Alternatively, if the signal-quality metric is greater than the signal-quality threshold value (thus indicating a stronger signal), access terminal 14a may send a "power down" PCC directed to BTS 20.

As a result of access terminal 14a regularly sending PCCs directed to BTS 20, BTS 20 may regularly receive PCCs from access terminal 14a. (It should be understood, however, that BTS 20 may fail to receive some PCCs sent by access terminal 14a due to poor reverse-link conditions or other factors.) In response to each PCC received from access terminal 14a, BTS 20 may then responsively adjust its forward transmission power to access terminal 14a in accordance with the PCC. For instance, in response to receiving a "power up" PCC from access terminal 14a, BTS 20 may increase its forward transmission power to access terminal 14a (unless the forward transmission power is already at a maximum level). And in response to receiving a "power down" PCC from access terminal 14a, BTS 20 may decrease its forward transmission power to access terminal 14a (unless the forward transmission power is already at a minimum level).

As discussed above, according to IS-2000, each of active access terminals 14a-d may regularly send PCCs directed to access network 12 on a respective reverse pilot channel of wireless link WL$_1$ at a predefined transmission rate (e.g., 800 PCCs/second). Along with traffic data transmitted on reverse traffic channels and other data transmitted on the reverse pilot channels, this PCC data on the reverse pilot channels contributes to the aggregate noise on the reverse link of wireless link WL$_1$ (i.e., the reverse noise). At certain times, such as when there are many active access terminals communicating on wireless link WL$_1$, this reverse noise may increase to an unacceptable level that hinders the access network's ability to receive reverse-link communications from access terminals 14a-d. Accordingly, it would be desirable to have a PCC transmission scheme in which active access terminals 14a-d can decrease the amount of PCC data sent to access network 12, which may in turn decrease the reverse noise and thereby improve reverse-link communications.

III. Exemplary PCC Transmission Scheme

As noted above, disclosed herein is an exemplary PCC transmission scheme that enables an active access terminal to decrease the amount of PCC data sent to an access network in certain circumstances, which may in turn decrease the reverse noise on the wireless link over which the access terminal and access network are communicating and thereby improve reverse-link communication. In a first aspect of the exemplary PCC transmission scheme, the active access terminal may decrease the PCC transmission rate for the access network (i.e., how often to generate and send PCCs directed to the access network) in time periods during which the reverse noise on the wireless link is greater than a threshold value. In a second aspect of the exemplary PCC transmission scheme, the active access terminal may suspend transmission of one type of PCCs (e.g., either "power up" or "power down" PCCs) directed to the access network in time periods during which the access network's forward transmission power to the active access terminal is at a boundary level. An active access terminal may implement these aspects of the exemplary PCC transmission scheme either together or separately.

a. First Aspect

Figure 2:
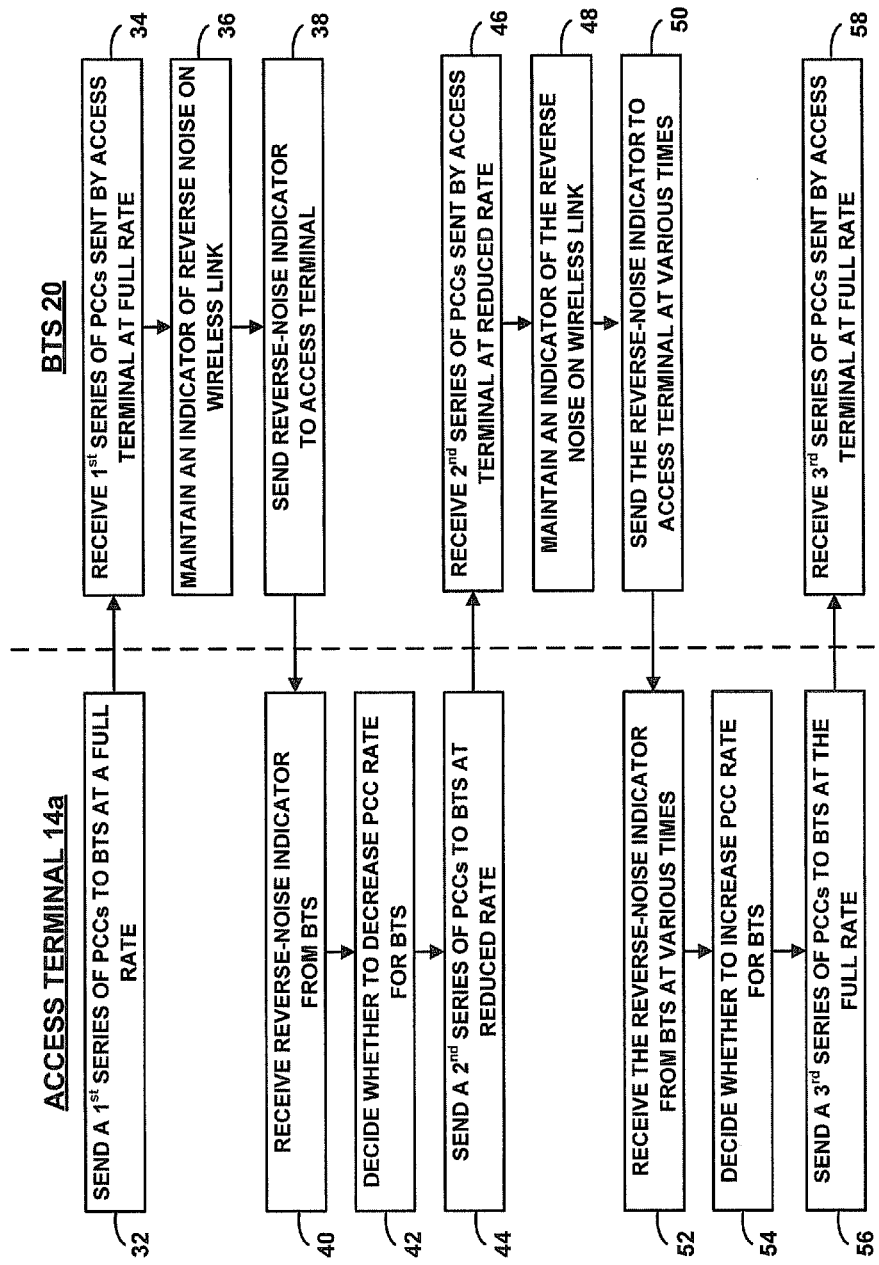
FIG. 2 is a simplified flow chart depicting an exemplary first aspect of the exemplary PCC transmission scheme.

FIG. 2 is a simplified flow chart depicting an exemplary first aspect of the exemplary PCC transmission scheme. For purposes of illustration, the first aspect will be described with reference to access terminal 14a sending PCCs directed to BTS 20 on wireless link WL$_1$, but it should be understood that the first aspect of the exemplary PCC transmission scheme may be applicable to any configuration in which a first entity is sending PCCs directed to a second entity.

The first aspect of the exemplary transmission scheme begins at step 32 with access terminal 14a sending a first series of PCCs directed to BTS 20 at a full transmission rate. (As used herein, the phrase "full transmission rate" means any rate at which BTS 20 is sending PCCs directed to access terminal 14a before deciding to decrease the transmission rate according to the techniques described herein). For example, access terminal 14a may be sending the first series of PCCs on a reverse pilot channel of wireless link WL$_1$ at a full transmission rate of 800 PCCs/second. Other examples are possible as well.

At step 34, as a result of access terminal 14a sending the first series of PCCs directed to BTS 20 at the full transmission rate, BTS 20 may be receiving the first series of PCCs sent by access terminal 14a at the full transmission rate. (As noted above, however, BTS 20 may fail to receive some PCCs sent by access terminal 14a due to poor reverse-link conditions or other factors.) In response to each PCC in the first series received from access terminal 14a, BTS 20 may then adjust its forward transmission power to access terminal 14a in accordance with the received PCC.

At step 36, while receiving the first series of PCCs from access terminal 14a, BTS 20 may be maintaining an indicator of the reverse noise on wireless link WL$_1$, such as by measuring the reverse noise on wireless link WL$_1$ and updating a stored reverse-noise indicator based on such measurements. BTS 20 may measure the reverse noise and/or update the stored reverse-noise indicator at various times. For instance, BTS 20 may regularly measure the reverse noise and/or update the stored reverse-noise indicator at a predefined rate (e.g., every frame). As another example, BTS 20 may measure the reverse noise and/or update the stored reverse-noise indicator each time BTS 20 starts receiving reverse communications from a new active access terminal. Other examples are possible as well.

The reverse-noise indicator may take various forms. As one example, the reverse-noise indicator may include a reverse noise rise (RNR) value, which is the difference between (a) the reverse noise that BTS 20 is currently detecting on wireless link $WL_1$ and (b) a baseline level of reverse noise. As another example, the reverse-noise indicator may include an indicator specifying whether the reverse noise detected by BTS 20 is greater than or less than a threshold value that defines whether reverse noise has reached an unacceptable level. This indicator may have a first value (e.g., 1) if BTS 20 determines that the reverse noise is greater than the reverse-noise threshold value (thus indicating a higher reverse noise level) and a second value (e.g., 0) if BTS 20 determines that the reverse noise is less than the reverse-noise threshold value (thus indicating a lower reverse noise level). Other examples are possible as well.

At step 38, while maintaining the reverse-noise indicator, BTS 20 may send the reverse-noise indicator to each of access terminals 14a-d at various times. For example, BTS 20 may regularly send the reverse-noise indicator to each of active access terminals 14a-d at a predefined rate (e.g., every 10 frames). As another example, BTS 20 may send the reverse-noise indicator to each of active access terminals 14a-d each time the reverse noise crosses a reverse-noise threshold value. For instance, BTS 20 may send the reverse-noise indicator to each of active access terminals 14a-d in response to determining that the reverse noise has risen above the reverse-noise threshold value. In turn, BTS 20 may send the reverse-noise indicator to each of active access terminals 14a-d in response to determining that the reverse noise has fallen below the reverse-noise threshold value. Other examples are possible as well. BTS 20 may send the reverse-noise indicator to each of active access terminals 14a-d in a signaling message on a respective forward traffic channel (or some other forward channel) of wireless link $WL_1$.

At step 40, as a result of BTS 20 sending the reverse-noise indicator to each of active access terminals 14a-d at various times, access terminal 14a may receive the reverse-noise indicator from BTS 20 at various times. (It should be understood, however, that access terminal 14a may fail to receive some reverse-noise indicators sent by access network 12 due to poor forward-link conditions or other factors.)

At step 42, each time it receives the reverse-noise indicator from BTS 20, access terminal 14a may decide whether to decrease the PCC transmission rate for BTS 20 from the full transmission rate to a reduced transmission rate. As one example, access terminal 14a may decide whether to decrease the PCC transmission rate for BTS 20 based on the received reverse-noise indicator and a table correlating reverse-noise indicators with transmission rates. Table 1 is one example table that correlates reverse-noise indicators (e.g., binary bit values) with transmission-rate indicators (e.g., PCCs/second):

TABLE 1

| Bit Value | PPCs/second |
|---|---|
| 0 | 800 |
| 1 | 400 |

The table may take other forms as well. In response to receiving the reverse-noise indicator, access terminal 14a may consult such a table to identify a transmission rate that correlates to the received reverse-noise indicator. If the identified transmission rate is the reduced transmission rate, access terminal 14a may then decide to decrease the PCC transmission rate for BTS 20 to the reduced transmission rate.

As another example, access terminal 14a may decide whether to decrease the PCC transmission rate for BTS 20 based on a comparison between the received reverse-noise indicator (e.g., a received RNR value) and a reverse-noise threshold value (e.g., a predefined RNR value). For instance, in response to receiving the reverse-noise indicator, access terminal 14a may compare the received reverse-noise indicator to the reverse-noise threshold value and thereby determine whether the reverse-noise indicator is greater than the reverse-noise threshold value (thus indicating a higher reverse noise). If so, access terminal 14a may decide to decrease the PCC transmission rate for BTS 20 to the reduced transmission rate.

As yet another example, access terminal 14a may decide whether to decrease the PCC transmission rate for BTS 20 based on a comparison between the just-received reverse-noise indicator and a previously-received reverse-noise indicator (e.g., the reverse-noise indicator received right before the just-received reverse-noise indicator). For instance, in response to receiving the reverse-noise indicator, access terminal 14a may compare the just-received reverse-noise indicator to a previously-received reverse-noise indicator and thereby determine whether the just-received reverse-noise indicator is greater than the previously-received reverse-noise indicator (thus indicating an increase in reverse noise). If so, access terminal 14a may decide to decrease the PCC transmission rate for BTS 20 to the reduced transmission rate. Other examples are possible as well.

At step 44, in response to deciding to decrease the PCC transmission rate for BTS 20 from the full transmission rate to the reduced transmission rate, access terminal 14a may then begin sending a second series of PCCs directed to BTS 20 at the reduced transmission rate. For example, access terminal 14a may begin sending the second series of PCCs on the reverse pilot channel of wireless link $WL_1$ at a reduced transmission rate of 400 PCCs/second. Other examples are possible as well.

At step 46, as a result of access terminal 14a sending the second series of PCCs directed to BTS 20 at the reduced transmission rate, BTS 20 may be receiving the second series of PCCs sent by access terminal 14a at the reduced transmission rate. (It should be understood, however, that BTS 20 may fail to receive some PCCs sent by access terminal 14a due to poor reverse-link conditions or other factors.) In response to each PCC in the second series received from access terminal 14a, BTS 20 may then adjust its forward transmission power to access terminal 14a in accordance with the received PCC.

At steps 48-50, while receiving the second series of PCCs from access terminal 14a, BTS 20 may continue maintaining the reverse-noise indicator and sending the reverse-noise indicator to each of active access terminals 14a-d at various times. In turn, at step 52, access terminal 14a may continue receiving the reverse-noise indicator from BTS 20 at various times.

At step 54, each time it receives the reverse-noise indicator from BTS 20, access terminal 14a may decide whether to increase the PCC transmission rate for BTS 20 from the reduced transmission rate back to the full transmission rate. Access terminal 14a may decide whether to increase the PCC transmission rate for BTS 20 using techniques similar to those described above with reference to step 42. For example, access terminal 14a may decide whether to increase the PCC transmission rate for BTS 20 based on the table correlating reverse-noise indicators with transmission rates. As another example, access terminal 14a may decide whether to increase the PCC transmission rate for BTS 20 based on a comparison between the received reverse-noise indicator and the reverse-noise threshold value. As yet another example, access terminal may decide whether to increase the PCC transmission rate for BTS 20 based on a comparison between the just-received reverse-noise indicator and a previously-received reverse-noise indicator. Other examples are possible as well.

At step 56, in response to deciding to increase the PCC transmission rate for BTS 20 from the reduced transmission rate back to the full transmission rate, access terminal 14a may then begin sending a third series of PCCs directed to BTS 20 at the full transmission rate. For example, access terminal 14a may begin sending the third series of PCCs on the reverse pilot channel of wireless link $WL_1$ at a full transmission rate of 800 PCCs/second. Other examples are possible as well.

At step 58, as a result of access terminal 14a sending the third series of PCCs directed to BTS 20 at the full transmission rate, BTS 20 may be receiving the third series of PCCs sent by access terminal 14a at the full transmission rate. (It should be understood, however, that BTS 20 may fail to receive some PCCs sent by access terminal 14a due to poor reverse-link conditions or other factors.) In response to each PCC in the third series received from access terminal 14a, BTS 20 may then adjust its forward transmission power to access terminal 14a in accordance with the received PCC.

In a similar manner, access terminal 14a may continue adjusting the PCC transmission rate for BTS 20 based on the reverse noise. Advantageously, this first aspect of the exemplary PCC transmission scheme may enable access terminal 14a (as well as other active access terminals 14b-d) to decrease the PCC transmission rate for access network 12—and thus decrease the amount of PCC data on wireless link $WL_1$—in time periods during which the reverse noise on wireless link $WL_1$ is greater than the reverse-noise threshold value. This decreased amount of PCC data on wireless link $WL_1$ may in turn decrease the reverse noise on wireless link $WL_1$ and thereby improve reverse-link communication.

b. Second Aspect

Figure 3:
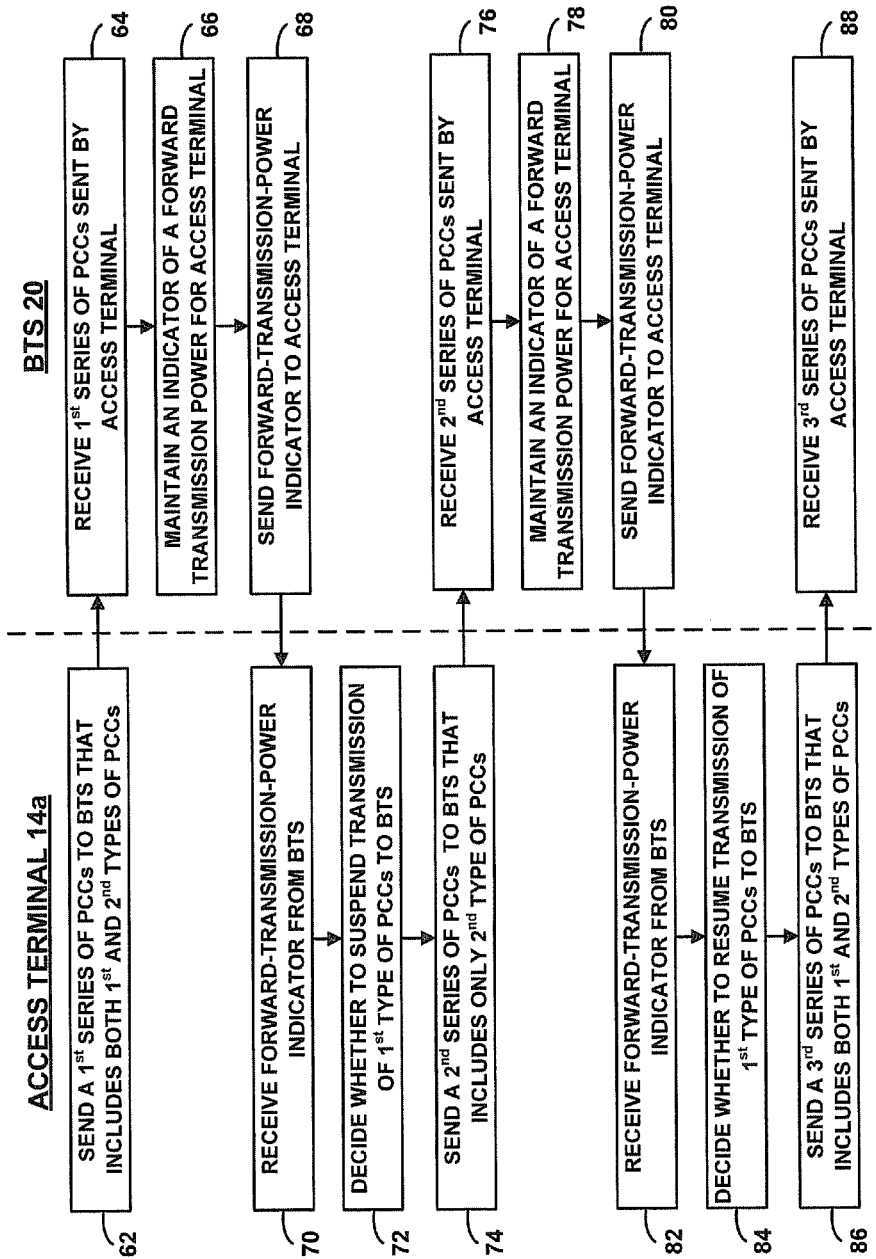
FIG. 3 is a simplified flow chart depicting an exemplary second aspect of the exemplary PCC transmission scheme.

FIG. 3 is a simplified flow chart depicting an exemplary second aspect of the exemplary PCC transmission scheme. For purposes of illustration, the second aspect will be described with reference to access terminal 14a sending PCCs directed to BTS 20, but it should be understood that the second aspect of the exemplary PCC transmission scheme may be applicable to any configuration in which a first entity is sending PCCs directed to a second entity.

The second aspect of the exemplary transmission scheme may begin at step 62 with access terminal 14a sending a first series of PCCs directed to BTS 20 that includes both first and second type of PCCs. For example, access terminal 14a may be sending the first series of PCCs with both "power up" PCCs and "power down" PCCs on a reverse pilot channel of wireless link $WL_1$. Other examples are possible as well.

At step 64, as a result of access terminal 14a sending the first series of PCCs directed to BTS 20, BTS 20 may be receiving the first series of PCCs sent by access terminal 14a. (It should be understood, however, that BTS 20 may fail to receive some PCCs sent by access terminal 14a due to poor reverse-link conditions or other factors.) In response to each PCC in the first series received from access terminal 14a, BTS 20 may then adjust its forward transmission power to access terminal 14a in accordance with the received PCC.

At step 66, while receiving the first series of PCCs from access terminal 14a, BTS 20 may be maintaining an indicator of a forward transmission power to access terminal 14a (as well as other access terminals 14b-d), such as by determining the forward transmission power to access terminal 14a and updating a stored forward-transmission-power indicator based on such determinations. BTS 20 may determine the forward transmission power to access terminal 14a and/or update the stored forward-transmission-power indicator at various times. For example, BTS 20 may regularly determine the forward transmission power to access terminal 14a and/or update the stored forward-transmission-power indicator at a predefined rate (e.g., every frame). As another example, BTS 20 may determine the forward transmission power to access terminal 14a and/or update the stored forward-transmission-power indicator each time BTS 20 adjusts the forward transmission power to access terminal 14a in accordance with a received PCC. Other examples are possible as well.

The forward-transmission-power indicator may take various forms. As one example, the forward-transmission-power indicator may include an $E_c$ power level at which BTS 20 is currently transmitting on the forward traffic channel to access terminal 14a. As another example, the forward-transmission-power indicator may include an indicator specifying whether the forward transmission power to access terminal 14a is at a boundary level. This indicator may have a first value (e.g., "00") if BTS 20 determines that the forward transmission power to access terminal 14a is not at a boundary level, a second value (e.g., "10") if BTS 20 determines that the forward transmission power to access terminal 14a is at a minimum level, and a third value (e.g., "11") if BTS 20 determines that the forward transmission power to access terminal 14a is at a maximum level. Other examples are possible as well.

At step 68, while maintaining the forward-transmission-power indicator, BTS 20 may send the forward-transmission-power indicator to access terminal 14a at various times. For example, BTS 20 may regularly send the forward-transmission-power indicator to access terminal 14a at a predefined rate (e.g., every 10 frames). As another example, BTS 20 may send the forward-transmission-power indicator to access terminal 14a each time the forward transmission power to access terminal 14a either reaches or moves away from a boundary level. For instance, BTS 20 may send the forward-transmission-power indicator to access terminal 14a in response to determining that the forward transmission power to access terminal 14a has reached a maximum or minimum level. Thereafter, BTS 20 may send the forward-transmission-power indicator to access terminal 14a in response to determining that the forward transmission power to access terminal 14a has moved away from the maximum or minimum level. Other examples are possible as well. BTS 20 may send the forward-transmission-power indicator to access terminal 14a in a signaling message on the forward traffic channel to access terminal 14a (or some other forward channel) of wireless link $WL_1$.

At step 70, as a result of BTS sending the forward-transmission-power indicator to access terminal 14a, access terminal 14a may receive the forward-transmission-power indicator from BTS 20 at various times. (It should be understood, however, that access terminal 14a may fail to receive some forward-transmission-power indicators sent by access network 12 due to poor forward-link conditions or other factors.)

At step 72, each time it receives the forward-transmission-power indicator from BTS 20, access terminal 14a may decide whether to suspend transmission of the first type of PCCs directed to BTS 20. For example, in response to receiving a forward-transmission-power indicator indicating that the forward transmission power to access terminal 14a is at a maximum level, access terminal 14a may decide to suspend transmission of "power up" PCCs directed to BTS 20. As another example, in response to receiving a forward-transmission-power indicator indicating that the forward transmission power to access terminal 14*a* is at a minimum level, access terminal 14*a* may decide to suspend transmission of "power down" PCCs directed to BTS 20. Other examples are possible as well.

At step 74, in response to deciding to suspend transmission of the first type of PCCs directed to BTS 20, access terminal 14*a* may then begin sending a second series of PCCs directed to BTS 20 that includes only a second type of PCCs. For example, in response to deciding to suspend transmission of "power up" PCCs directed to BTS 20, access terminal 14*a* may begin sending a second series of PCCs with only "power down" PCCs on a reverse pilot channel of wireless link $WL_1$. In this example, access terminal 14*a* may forego transmission of a PCC at any time in the second series during which access terminal 14*a* would otherwise send a "power up" PCC. In an alternate example, in response to deciding to suspend transmission of "power down" PCCs directed to BTS 20, access terminal 14*a* may begin sending a second series of PCCs with only "power up" PCCs on a reverse pilot channel of wireless link $WL_1$. In this example, access terminal 14*a* may forego transmission of a PCC at any time in the second series during which access terminal 14*a* would otherwise send a "power down" PCC.

At step 76, as a result of access terminal 14*a* sending the second series of PCCs directed to BTS 20 that includes only the second type of PCCs, BTS 20 may be receiving the second series of PCCs from access terminal 14*a*. (It should be understood, however, that BTS 20 may fail to receive some PCCs sent by access terminal 14*a* due to poor reverse-link conditions or other factors.) In response to each of PCCs of the second type in the second series received from access terminal 14*a*, BTS 20 may then adjust its forward transmission power to access terminal 14*a* in accordance with the received PCC.

At steps 78-80, while receiving the second series of PCCs from access terminal 14*a*, BTS 20 may continue maintaining the forward-transmission-power indicator and sending the forward-transmission-power indicator to each of active access terminals 14*a-d* at various times. In turn, at step 82, access terminal 14*a* may continue receiving the forward-transmission-power indicator from BTS 20 at various times.

At step 84, each time it receives the forward-transmission-power indicator from BTS 20, access terminal 14*a* may decide whether to resume transmission of the first type of PCCs directed to BTS 20. For example, in response to receiving a forward-transmission-power indicator specifying that the forward transmission power to access terminal 14*a* is not at a boundary level, access terminal 14*a* may decide to resume transmission of the first type of PCCs directed to BTS 20.

At step 86, in response to deciding to resume transmission of the first type of PCCs directed to BTS 20, access terminal 14*a* may then begin sending a third series of PCCs directed to BTS 20 that includes both the first and second types of PCCs. For example, access terminal 14*a* may begin sending the third series of PCCs with both "power up" PCCs and "power down" PCCs on a reverse pilot channel of wireless link $WL_1$.

At step 88, as a result of access terminal 14*a* sending the third series of PCCs directed to BTS 20, BTS 20 may be receiving the third series of PCCs from access terminal 14*a*. (It should be understood, however, that BTS 20 may fail to receive some PCCs sent by access terminal 14*a* due to poor reverse-link conditions or other factors.) In response to each PCC in the third series of PCCs received from access terminal 14*a*, BTS 20 may then adjust its forward transmission power to access terminal 14*a* in accordance with the received PCC.

In a similar manner, access terminal 14*a* may continue suspending and/or resuming transmission of the first and/or second types of PCCs directed to BTS 20 based on the BTS's forward transmission power to access terminal 14*a*. Advantageously, this second aspect of the exemplary PCC transmission scheme may enable access terminal 14*a* (as well as other active access terminals 14*b-d*) to suspend transmission of one type of PCCs—and thus decrease the amount of PCC data on wireless link $WL_1$—in time periods during which the BTS's forward transmission power to access terminal 14*a* is at a boundary power level such that BTS 20 cannot adjust that forward transmission power in response to that type of PCCs. This decreased amount of PCC data on wireless link $WL_1$ may in turn decrease the reverse noise on wireless link $WL_1$ and thereby improve reverse-link communication.

c. Exemplary Timeline

Figure 4:
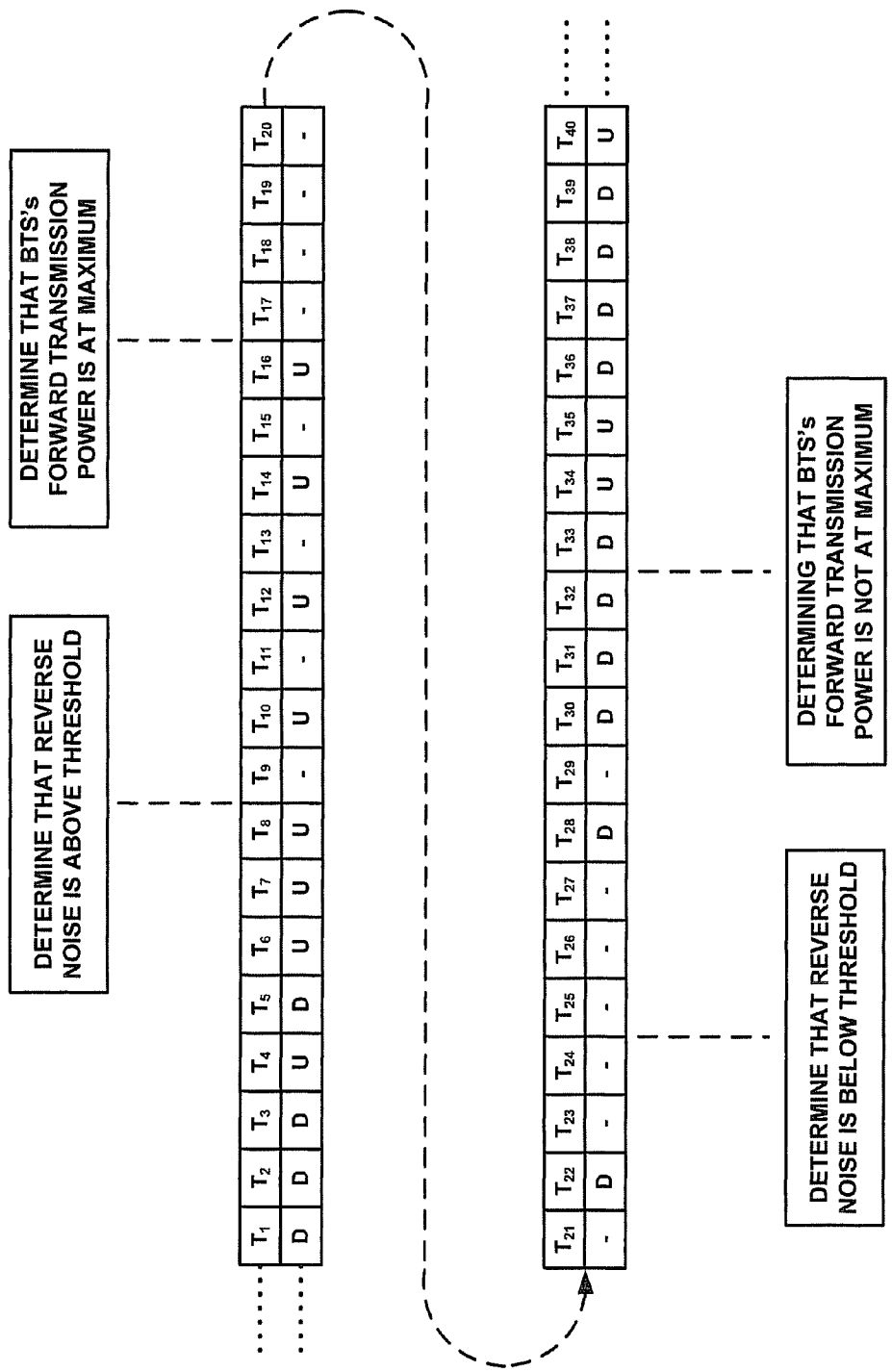
FIG. 4 is an exemplary timeline of PCCs sent from an access terminal to a base transceiver station on a given reverse-link channel of a wireless link.

One implementation of the exemplary PCC transmission scheme will now be described with reference to FIG. 4, which is an exemplary timeline of PCCs sent from access terminal 14*a* to BTS 20 on a given reverse-link channel of wireless link $WL_1$ (e.g., an IS-2000 reverse pilot channel). For purposes of illustration only, FIG. 4 depicts the given reverse link channel as comprising a plurality of timeslots $T_1$-$T_{40}$ and assumes that each timeslot has a duration of 1.25 ms.

As shown during timeslots $T_1$-$T_8$, access terminal 14*a* may initially be sending a first series of PCCs with both "power up" PCCs and "power down" PCCs at a full transmission rate of 800 PCCs/second (i.e., one PCC in every 1.25 ms timeslot).

Before timeslot $T_9$, access terminal 14*a* may then determine that the reverse noise on wireless link $WL_1$ has risen above a reverse-noise threshold value. For example, access terminal 14*a* may receive from BTS 20 a reverse-noise indicator specifying that the reverse noise on wireless link $WL_1$ is greater than the reverse-noise threshold value. In response, access terminal 14*a* may decide to decrease its PCC transmission rate for BTS 20 from the full transmission rate of 800 PCCs/second to a reduced transmission rate of 400 PCCs/second (i.e., one PCC in every other 1.25 ms timeslot). Thus, starting at timeslot $T_9$, access terminal 14*a* may begin sending a second series of PCCs with both "power up" PCCs and "power down" PCCs at the reduced transmission rate of 400 PCCs/second.

Before timeslot $T_{17}$, access terminal 14*a* may then determine that BTS's forward transmission power to access terminal 14*a* has reached a maximum level. For example, access terminal 14*a* may receive from BTS 20 a forward-transmission-power indicator specifying that the BTS's forward transmission power to access terminal 14*a* is at the maximum level. In response, access terminal 14*a* may decide to suspend transmission of "power up" PCCs directed to BTS 20. Thus, starting at timeslot $T_{17}$, access terminal 14*a* may begin sending a third series of PCCs with only "power down" PCCs at the reduced transmission rate of 400 PCCs/second. During the third series of PCCs, access terminal 14*a* may forego transmission of a PCC in any timeslot during which access terminal 14*a* would otherwise send a "power up" PCC.

Before timeslot $T_{25}$, access terminal 14*a* may then determine that the reverse noise on wireless link $WL_1$ has fallen back below the reverse-noise threshold value. For example, access terminal 14*a* may receive from BTS 20 a reverse-noise indicator specifying that the reverse noise on wireless link $WL_1$ is less than the reverse-noise threshold value. In response, access terminal 14*a* may decide to increase its PCC transmission rate for BTS 20 from the reduced transmission rate of 400 PCCs/second back to the full transmission rate of 800 PCCs/second. Thus, starting at timeslot $T_{25}$, access terminal 14*a* may begin sending a fourth series of PCCs with only "power down" PCCs at the full transmission rate of 800 PCCs/second. During the fourth series of timeslots, access terminal 14a may again forego transmission of a PCC in any timeslot during which access terminal 14a would otherwise send a "power up" PCC.

Before timeslot $T_{33}$, access terminal 14a may then determine that BTS's forward transmission power to access terminal 14a has moved away from the maximum level. For example, access terminal 14a may receive from BTS 20 a forward-transmission-power indicator specifying that the BTS's forward transmission power to access terminal 14a is not at the maximum level. In response, access terminal 14a may decide resume transmission of "power up" PCCs directed to BTS 20. Thus, starting at timeslot $T_{33}$, access terminal 14a may begin sending a fifth series of PCCs with both "power up" PCCs and "power down" PCCs at a full transmission rate of 800 PCCs/second.

Access terminal 14a may then continue adjusting the amount of the PCC data it sends to access network 12 according to the techniques described herein while access terminal 14a is active. Similarly, access terminals 14b-d may also adjust the amount of the PCC data they send to access network 12 according to the techniques described herein while those access terminals are active.

IV. Exemplary Access Terminal

Figure 5:
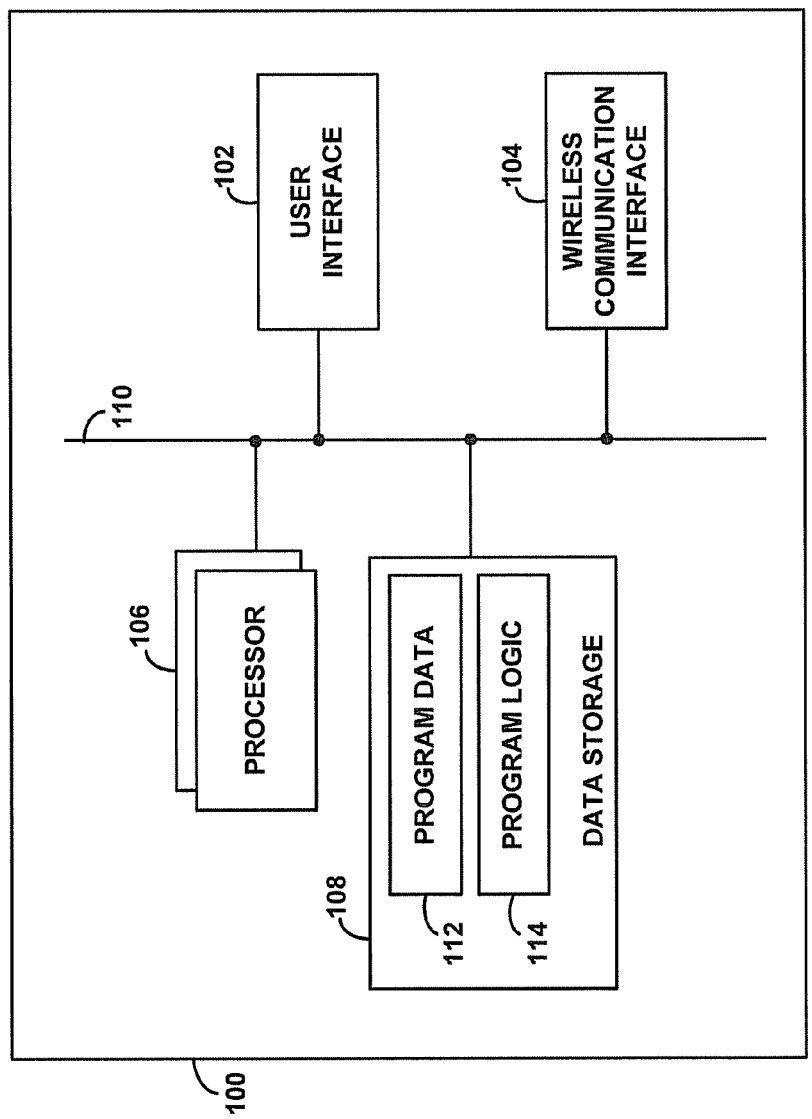
FIG. 5 is a simplified block diagram showing functional components of an exemplary access terminal capable of carrying out features of the exemplary PCC transmission scheme of FIGS. 2-4.

FIG. 5 is a simplified block diagram showing functional components of an exemplary access terminal 100 capable of carrying out features of the exemplary PCC transmission scheme described with reference to FIGS. 2-4. As shown in FIG. 5, exemplary access terminal 100 may include a user interface 102, a wireless communication interface 104, a processor 106, and data storage 108, all linked together via a system bus, network, or other connection mechanism 110. Access terminal 100 may include other components as well.

Referring to FIG. 5, the user interface 102 may function to facilitate user interaction with access terminal 100. As such, user interface 102 may include or provide connectivity to various components that facilitate user interaction. For example, user interface 102 may include or provide connectivity to input components such as a touch screen, a navigation pad, a multi-functional button, a thumb wheel, a keyboard or keypad, and/or a microphone for instance. As another example, user interface 102 may include or provide connectivity to output components such as a display screen and/or a speaker for instance. As yet another example, user interface 102 may include signal processing components such as analog-to-digital (A-D) and/or digital-to-analog (D-A) circuitry. Other configurations are possible as well.

Wireless communication interface 104 may function to facilitate wireless communication with access network 12 according to one or more wireless protocols, such as the protocols noted above. As such, wireless communication interface 104 may include a chipset (e.g., an MSM™ series chipset manufactured by Qualcomm Incorporated of San Diego, Calif.) and one or more antennas adapted to communicate according to one or more protocols. Other configurations are possible as well.

Processor 106 may comprise one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), or other processor components now known or later developed. Data storage 108, in turn, may comprise one or more non-transitory computer-readable storage mediums, such as volatile data storage mediums (e.g., random access memory (RAM), registers, and/or cache) and/or non-volatile data storage mediums (e.g., read only memory (ROM), a hard disk drive, a solid state drive, flash memory, an optical storage device, and/or a floppy disk). Some storage mediums may be integrated in whole or in part with the processor 106. Further, some storage mediums may be external to and/or removable from access terminal 100 and may interface with access terminal 100 in various manners. In one example, as shown, data storage 108 may contain (i) program data 112 and (ii) program logic 114, which may be maintained either separately or together within data storage 108.

Program data 112 may contain information identifying a communication with access network 12. For example, program data 112 may contain an identifier of a wireless link over which access terminal 100 is communicating with access network 12 (e.g., a carrier frequency and a PN offset). As another example, program data 112 may contain identifiers of forward and reverse channels over which access terminal 100 is communicating with access network 12 (e.g., Walsh codes). Other examples are possible as well.

Further, program data 112 may contain information relating to a PCC transmission scheme for access network 12. For example, program data 112 may contain an indicator of a current PCC transmission rate for access network 12. As another example, program data 112 may contain indicators of available PCC transmission rates for access network 12 (e.g., 800 PCCs/second, 400 PCCs/second, etc.). Other examples are possible as well.

Further yet, program data 112 may contain information relating to reverse noise on a wireless link over which access terminal 100 is communicating with access network 12. For example, program data 112 may contain an indicator of the reverse noise on such a wireless link. As another example, program data 112 may contain a table that correlates reverse-noise indicators with transmission rate (e.g. Table 1 described above). As yet another example, program data 112 may contain a reverse-noise threshold value (e.g., a predefined RNR value). Other examples are possible as well.

Still further, program data 112 may contain information relating to the access network's forward transmission power to access terminal 100. For example, program data 112 may contain an indicator of the access network's forward transmission power to access terminal 100. Other examples are possible as well.

Program logic 114 preferably comprises machine-language instructions that may be executed or interpreted by processor 106 to carry out functions in accordance with the exemplary PCC transmission scheme described with reference to FIGS. 2-4. For purposes of illustration, the following functions will be described with reference to access terminal 100 sending PCCs directed to BTS 20 on wireless link $WL_1$, but it should be understood that access terminal 100 may carry out these functions while sending PCCs direct to any entity.

According to the first aspect of the exemplary PCC transmission scheme, program logic 114 may be executable by processor 106 to adjust the PCC transmission rate for BTS 20 based on a reverse noise on wireless link $WL_1$. For example, program logic 114 may be executable by processor 106 to (a) send a first series of PCCs directed to BTS 20 at a full transmission rate, (b) receive from BTS 20 a first indicator of the reverse noise on wireless link $WL_1$, where the first indicator indicates that the reverse noise is greater than the reverse-noise threshold value, (c) in response to receiving the first indicator, decide to decrease the PCC transmission rate for BTS 20 to a reduced transmission rate, and (d) in response to deciding to decrease the PCC transmission rate for BTS 20, send a second series of PCCs directed to BTS 20 at the reduced transmission rate. Additionally, program logic 114 may be executable by processor 106 to (e) receive from BTS 20 a second indicator of the reverse noise on wireless link $WL_1$, where the second indicator indicates that the reverse noise is less than the reverse-noise threshold value, (f) in response to receiving the second indicator, decide to increase the PCC transmission rate for BTS 20 back to the full transmission rate, and (g) in response to deciding to increase the PCC transmission rate for BTS 20, send a third series of PCCs directed to BTS 20 at the full transmission rate. Other examples are possible as well.

According to the second aspect of the exemplary PCC transmission scheme, program logic 114 may be executable by processor 106 to suspend and/or resume transmission of first and/or second types of PCCs directed to BTS 20 based on the BTS's forward transmission power to access terminal 100. For example, program logic 114 may be executable by processor 106 to (a) send a first series of PCCs directed to BTS 20 that includes both first and second types of PCCs, (b) receive from BTS 20 a first indicator of the BTS's forward transmission power to access terminal 100, where the first indicator indicates that the forward transmission power is at a boundary level, (c) in response to receiving the first indicator, decide to suspend transmission of the first type of PCCs directed to BTS 20, and (d) in response to deciding to suspend transmission of the first type of PCCs, send a second series of PCCs directed to BTS 20 that includes only the second type of PCCs. Additionally, program logic 114 may be executable by processor 106 to (e) receive from BTS 20 a second indicator of the BTS's forward transmission power to access terminal 100, where the second indicator indicates that the forward transmission power is not at a boundary level, (c) in response to receiving the second indicator, decide to resume transmission of the first type of PCCs directed to BTS 20, and (d) in response to deciding to resume transmission of the first type of PCCs, send a third series of PCCs directed to BTS 20 that includes both the first and second types of PCCs. Other examples are possible as well.

V. Exemplary BTS

Figure 6:
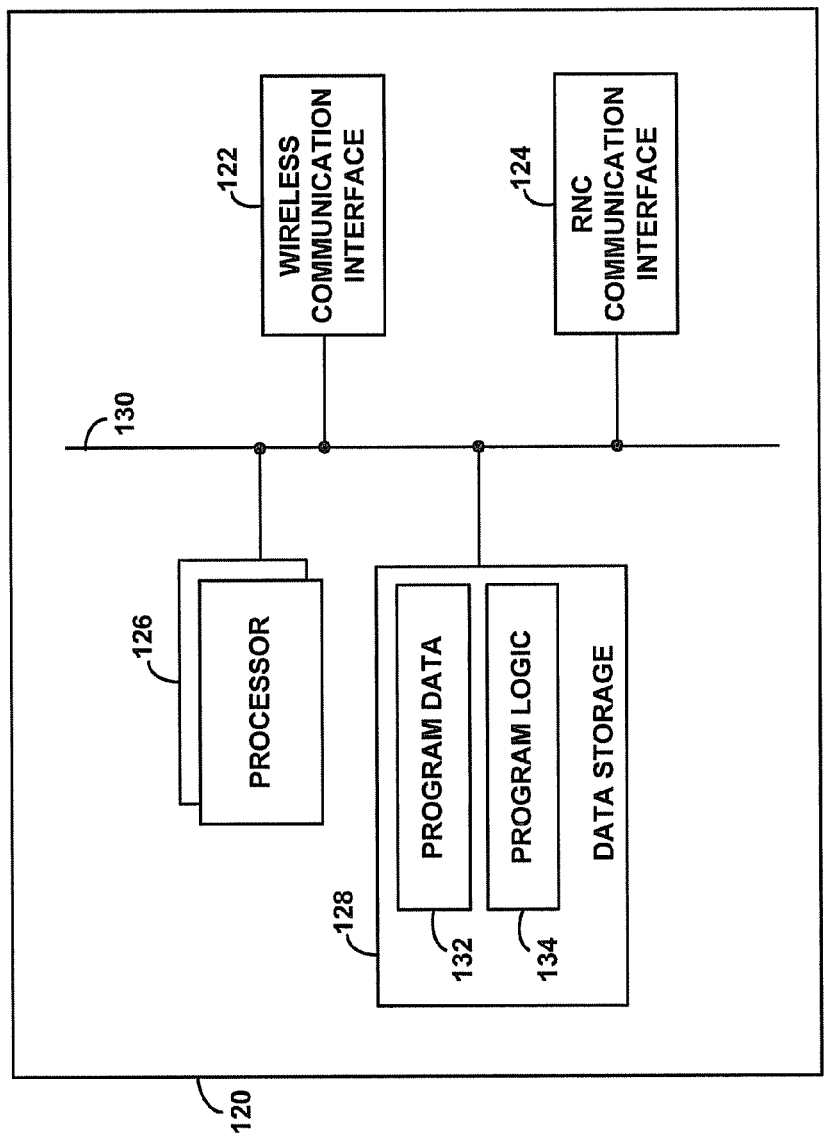
FIG. 6 is a simplified block diagram showing functional components of an exemplary base transceiver station capable of carrying out features of the exemplary PCC transmission scheme of FIGS. 2-4.

FIG. 6 is a simplified block diagram showing functional components of an exemplary BTS 120 capable of carrying out features of the exemplary PCC transmission scheme described with reference to FIGS. 2-4. (It should be understood, however, that one or more other access network entities may additionally or alternatively be capable carrying out features of the exemplary PCC transmission scheme). As shown in FIG. 6, exemplary BTS 120 may include a wireless communication interface 122, an RNC communication interface 124, a processor 126, and data storage 128, all linked together via a system bus, network, or other connection mechanism 100. BTS 120 may include other components as well.

Referring to FIG. 6, wireless communication interface 122 may radiate to define one or more wireless coverage areas and provide one or more wireless links, such as wireless link $WL_1$, over which access terminals may communicate with BTS 120. As such, wireless communication interface 122 may include one or more antenna structures arranged in various ways (e.g., one or more directional or sectored antennas). Additionally, wireless communication interface 122 may include at least one power amplifier for each provided wireless link. Each such power amplifier may enable BTS 120 to adjust both its total transmission power on each forward link and its transmission power on each respective channel of each forward link. In this respect, each such power amplifier may also define practical limits on the maximum and minimum power levels at which BTS 120 can transmit on each forward link and each respective channel of each forward link. Other configurations are possible as well.

RNC communication interface 124 may function to communicatively couple BTS 120 to an RNC, such as RNC 22. As such, RNC communication interface 124 may take the form of an Ethernet interface, a serial bus interface (e.g., Firewire, USB 2.0, etc.), a chipset and antenna adapted to facilitate wireless communication according a desired protocol, and/or any other interface that provides for wired and/or wireless communication with an RNC. RNC communication interface 124 may also include multiple interfaces, such as an Ethernet interface and a serial bus interface. Other configurations are possible as well.

Processor 126 may comprise one or more processor components, such as general-purpose processors (e.g., a microprocessor), application-specific processors (e.g., ASIC or DSP), programmable logic devices (e.g., FPGA), or other processor components now known or later developed. Data storage 128, in turn, may comprise one or more non-transitory computer-readable storage mediums, such as volatile data storage mediums (e.g., RAM, registers, and/or cache) and/or non-volatile data storage mediums (e.g., ROM, a hard disk drive, a solid state drive, flash memory, an optical storage device, and/or a floppy disk). Some storage mediums may be integrated in whole or in part with the processor 126. Further, some storage mediums may be external to and/or removable from BTS 120 and may interface with BTS 120 in various manners. As shown, data storage 128 may contain (i) program data 132 and (ii) program logic 134, which may be maintained either separately or together within data storage 128.

Program data 132 may contain information identifying a communication with each active access terminal. For example, program data 132 may contain an identifier of each active access terminal in communication with BTS 120. As another example, program data 132 may contain identifiers of forward and reverse channels over which BTS 120 is communicating with each active access terminal. Other examples are possible as well.

Further, program data 132 may contain information relating to reverse noise on each wireless link provided by BTS 20. For example, program data 132 may contain an indicator of the detected reverse noise on each provided wireless link. As another example, program data 132 may contain at least one threshold value that defines whether reverse noise has reached an unacceptable level (e.g., a predefined RNR value). Other examples are possible as well.

Further yet, program data 132 may contain information relating to the BTS's forward transmission power. For example, program data 132 may contain an indicator of a current forward transmission power value for each active access terminal. As another example, program data 132 may contain an indicator of each boundary level (e.g., maximum and minimum level) for forward transmission power. Other examples are possible as well.

Program logic 134 preferably comprises machine-language instructions that may be executed or interpreted by processor 126 to carry out functions in accordance with functions in accordance with the exemplary PCC transmission scheme described with reference to FIGS. 2-4. For purposes of illustration, the following functions will be described with reference to BTS 120 receiving PCCs from access terminal 14a on wireless link WL$_1$, but it should be understood that BTS 120 may carry out these functions while receiving PCCs from any entity.

According to the first aspect of the exemplary PCC transmission scheme, program logic 134 may be executable by processor 126 to receive PCCs sent by access terminal 14a at different PCC transmission rates depending on a reverse noise on wireless link WL$_1$. For example, program logic 134 may be executable by processor 126 to (a) receive a first series of PCCs sent by access terminal 14a at a full transmission rate, (b) maintain an indicator of the reverse noise on wireless link WL$_1$, (c) send to access terminal 14a a first indicator of the reverse noise on wireless link WL$_1$, where the first indicator indicates that the reverse noise is greater than a reverse-noise threshold value, and (d) as a result of sending the first indicator, receive a second series of PCCs sent by access terminal 14a at a reduced transmission rate. Additionally, program logic 134 may be executable by processor 126 to (e) send to access terminal 14a a second indicator of the reverse noise on wireless link WL$_1$, where the second indicator indicates that the reverse noise is less than a reverse-noise threshold value, and (f) as a result of sending the second indicator, receive a third series of PCCs sent by access terminal 14a at full transmission rate. Other examples are possible as well.

According to the second aspect of the exemplary PCC transmission scheme, program logic 134 may be executable by processor 126 to receive one or both of the first and second types of PCCs sent by access terminal 14a depending on the BTS's forward transmission power to access terminal 14a. For example, program logic 134 may be executable by processor 126 to (a) receive a first series of PCCs sent by access terminal 14a that includes both first and second types of PCCs, (b) maintain an indicator of the BTS's forward transmission power to access terminal 14a, (c) send to access terminal 14a a first indicator of the BTS's forward transmission power to access terminal 14a, where the first indicator indicates that the BTS's forward transmission power to access terminal 14a is at a boundary level, and (d) as a result of sending the first indicator, receive a second series of PCCs sent by access terminal 14a that includes only the second type of PCCs. Additionally, program logic 134 may be executable by processor 126 to (e) send to access terminal 14a a second indicator of the BTS's forward transmission power to access terminal 14a, where the second indicator indicates that the BTS's forward transmission power to access terminal 14a is not at a boundary level, and (f) as a result of sending the second indicator, receive a third series of PCCs sent by access terminal 14a that includes both the first and second types of PCCs. Other examples are possible as well.

VI. Conclusion

Exemplary embodiments have been described above. Those skilled in the art will understand, however, that changes and modifications may be made to the embodiments described without departing from the true scope and spirit of the present invention, which is defined by the claims.

I claim:

1. A method of sending power control commands (PCCs) to an access network on a wireless link, the method comprising:

an access terminal sending a first series of PCCs directed to the access network at a full transmission rate;

the access terminal receiving from the access network a first indicator of reverse noise on the wireless link, wherein the first indicator indicates that the reverse noise is greater than a threshold value;

in response to receiving the first indicator of the reverse noise, the access terminal deciding to decrease the transmission rate at which to send PCCs directed to the access network from the full transmission rate to a reduced transmission rate; and in response to deciding to decrease the transmission rate at which to send PCCs directed to the access network, the access terminal sending a second series of PCCs directed to the access network at the reduced transmission rate.

2. The method of claim 1, wherein the first indicator of the reverse noise comprises an indicator specifying that the reverse noise is greater than the threshold value.

3. The method of claim 1, wherein the first indicator of the reverse noise comprises a reverse noise rise (RNR) value that is greater than the threshold value.

4. The method of claim 1, wherein deciding to decrease the transmission rate at which to send PCCs directed to the access network in response to receiving the first indicator of the reverse noise comprises:

in response to receiving the first indicator of the reverse noise, consulting a table that correlates indicators of reverse noise with transmission rates to identify a transmission rate that correlates to the first indicator of the reverse noise;

determining that the identified transmission rate is the reduced transmission rate; and in response to determining that the identified transmission rate is the reduced transmission rate, deciding to decrease the transmission rate at which to send PCCs directed to the access network from the full transmission rate to the reduced transmission rate.

5. The method of claim 1, wherein deciding to decrease the transmission rate at which to send PCCs directed to the access network in response to receiving the first indicator of the reverse noise comprises:

in response to receiving the first indicator of the reverse noise, comparing the first indicator of the reverse noise to the threshold value and thereby determining that the first indicator of the reverse noise is greater than the threshold value; and in response to determining that the first indicator of the reverse noise is greater than the threshold value, deciding to decrease the transmission rate at which to send PCCs directed to the access network from the full transmission rate to the reduced transmission rate.

6. The method of claim 1, wherein deciding to decrease the transmission rate at which to send PCCs directed to the access network in response to receiving the first indicator of the reverse noise comprises:

in response to receiving the first indicator of the reverse noise, comparing the first indicator of the reverse noise to a previously-received indicator of the reverse noise and thereby determining that the first indicator of the reverse noise is greater than the previously-received indicator of the reverse noise; and in response to determining that the first indicator of the reverse noise is greater than the previously-received indicator of the reverse noise, deciding to decrease the transmission rate at which to send PCCs directed to the access network from the full transmission rate to the reduced transmission rate.

7. The method of claim 1, further comprising:

the access terminal receiving from the access network a second indicator of the reverse noise on the wireless link, wherein the second indicator indicates that the reverse noise is less than a threshold value;

in response to receiving the second indicator of the reverse noise, the access terminal deciding to increase the transmission rate at which to send PCCs directed to the access network from the reduced transmission rate back to the full transmission rate; and in response to deciding to increase the transmission rate at which to send PCCs directed to the access network, the access terminal sending a third series of PCCs directed to the access network at the full transmission rate.

8. The method of claim 1, wherein the first series of PCCs and the second series of PCCs each comprise both a first type of PCCs and a second type of PCCs.

9. The method of claim 1, wherein the first series of PCCs and the second series of PCCs each comprise only a second type of PCCs.

10. A method of sending power control commands (PCCs) to an access network on a wireless link, the method comprising:

an access terminal sending a first series of PCCs directed to the access network, wherein the first series of PCCs includes both a first type of PCCs and a second type of PCCs;

the access terminal receiving from the access network a first indicator of a power level at which the access network is transmitting to the access terminal on the wireless link, wherein the first indicator indicates that the power level is at a boundary level;

in response to receiving the first indicator of the power level, the access terminal deciding to suspend transmission of the first type of PCCs directed to the access network; and in response to deciding to suspend transmission of the first type of PCCs directed to the access network, the access terminal sending a second series of PCCs directed to the access network, wherein the second series of PCCs includes only the second type of PCCs.

11. The method of claim 10, wherein:
the boundary level comprises a maximum level;
the first type of PCCs comprises PCCs that instruct the access network to increase the power level at which the access network is transmitting to the access terminal on the wireless link; and
the second type of PCCs comprises PCCs that instruct the access network to decrease the power level at which the access network is transmitting to the access terminal on the wireless link.

12. The method of claim 10, wherein:
the boundary level comprises a minimum level;
the first type of PCCs comprises PCCs that instruct the access network to decrease the power level at which the access network is transmitting to the access terminal on the wireless link; and
the second type of PCCs comprises PCCs that instruct the access network to increase the power level at which the access network is transmitting to the access terminal on the wireless link.

13. The method of claim 10, wherein the first indicator of the power level comprises an indicator specifying that the power level is at a given boundary level.

14. The method of claim 10, wherein the first indicator of the power level comprises an $E_c$ power level at which the access network is transmitting to the access terminal on the wireless link.

15. The method of claim 10, wherein sending the second series of PCCs directed to the access network comprises:

foregoing transmission of a PCC at any time in the second series during which the access terminal would otherwise be sending a PCC of the first type of PCCs.

16. The method of claim 10, further comprising:
the access terminal receiving from the access network a second indicator of the power level at which the access network is transmitting to the access terminal on the wireless link, wherein the second indicator indicates that the power level is not at a boundary level;

in response to receiving the second indicator of the power level, the access terminal deciding to resume transmission of the first type of PCCs directed to the access network; and in response to deciding to resume transmission of the first type of PCCs directed to the access network, the access terminal sending a third series of PCCs directed to the access network, wherein the third series of PCCs includes both the first type of PCCs and the second type of PCCs.

17. The method of claim 10, wherein:
sending the first series of PCCs directed to the access network comprises sending the first series of PCCs directed to the access network at a full transmission rate; and
sending the second series of PCCs directed to the access network comprises sending the second series of PCCs directed to the access network at the full transmission rate.

18. The method of claim 10, wherein:
sending the first series of PCCs directed to the access network comprises sending the first series of PCCs directed to the access network at a reduced transmission rate; and
sending the second series of PCCs directed to the access network comprises sending the second series of PCCs directed to the access network at the reduced transmission rate.

19. An access terminal comprising:
a wireless communication interface configured to facilitate wireless communication with an access network on a wireless link;
a processor;
data storage; and
program instructions stored in data storage and executable by the processor to:
send a first series of power control commands (PCCs) directed to the access network at a full transmission rate;
receive from the access network a first indicator of reverse noise on the wireless link, wherein the first indicator indicates that the reverse noise is greater than a threshold value;
in response to receiving the first indicator of the reverse noise, decide to decrease the transmission rate at which to send PCCs directed to the access network from the full transmission rate to a reduced transmission rate; and
in response to deciding to decrease the transmission rate at which to send PCCs directed to the access network, send a second series of PCCs directed to the access network at the reduced transmission rate.

20. An access terminal comprising:
a wireless communication interface configured to facilitate wireless communication with an access network on a wireless link;
a processor;
data storage; and program instructions stored in data storage and executable by the processor to:
send a first series of power control commands (PCCs) directed to the access network, wherein the first series of PCCs includes both a first type of PCCs and a second type of PCCs;
receive from the access network a first indicator of a power level at which the access network is transmitting to the access terminal on the wireless link, wherein the first indicator indicates that the power level is at a boundary level;

in response to receiving the first indicator of the power level, decide to suspend transmission of the first type of PCCs directed to the access network; and
in response to deciding to suspend transmission of the first type of PCCs directed to the access network, send a second series of PCCs directed to the access network, wherein the second series of PCCs includes only the second type of PCCs.

* * * * *